US012413686B2

United States Patent
Batt et al.

(10) Patent No.: US 12,413,686 B2
(45) Date of Patent: Sep. 9, 2025

(54) SELECTED FOLLOW-ALONG PARTICIPANTS FOR VIEWPORT SYNCHRONIZATION

(71) Applicant: Zoom Communications, Inc., San Jose, CA (US)

(72) Inventors: Palmer Harold Batt, Seattle, WA (US); Alicia Anne-Kepner Brekke, Richmond, VA (US); Stephen George Newton, San Jose, CA (US); Jeffrey William Smith, Layton, UT (US)

(73) Assignee: Zoom Communications, Inc., San Jose, CA (US)

( * ) Notice: Subject to any disclaimer, the term of this patent is extended or adjusted under 35 U.S.C. 154(b) by 324 days.

(21) Appl. No.: 18/156,513

(22) Filed: Jan. 19, 2023

(65) Prior Publication Data
US 2024/0251058 A1    Jul. 25, 2024

(51) Int. Cl.
*H04N 7/15* (2006.01)
*H04L 65/401* (2022.01)
*H04N 7/14* (2006.01)

(52) U.S. Cl.
CPC ......... *H04N 7/152* (2013.01); *H04L 65/4015* (2013.01); *H04N 7/147* (2013.01)

(58) Field of Classification Search
CPC .... H04N 7/152; H04N 7/147; H04L 65/4015; H04L 65/1089; H04L 65/403
See application file for complete search history.

(56) References Cited

U.S. PATENT DOCUMENTS

| 9,936,162 | B1 | 4/2018 | Gadnir et al. |
| 10,705,783 | B2 | 7/2020 | Coplen et al. |
| 11,061,547 | B1 | 7/2021 | Fieldman |
| 2013/0176910 | A1* | 7/2013 | Gorti ............... H04M 3/56 370/260 |
| 2013/0198657 | A1* | 8/2013 | Jones ............ H04L 12/1827 715/753 |
| 2015/0009278 | A1 | 1/2015 | Modai et al. |
| 2017/0039022 | A1* | 2/2017 | Coplen ............. G06F 3/1454 |
| 2017/0115855 | A1 | 4/2017 | Farouki |
| 2019/0324712 | A1* | 10/2019 | Abuelsaad ......... H04M 3/569 |
| 2022/0255974 | A1* | 8/2022 | Berliner ............. G06T 19/20 |

FOREIGN PATENT DOCUMENTS

| CN | 106326343 A | 1/2017 |
| WO | 2017107499 A1 | 6/2017 |
| WO | 2019237675 A1 | 12/2019 |

* cited by examiner

Primary Examiner — Phung-Hoang J Nguyen
(74) Attorney, Agent, or Firm — Young Basile Hanlon & MacFarlane, P.C.

(57) ABSTRACT

A request is received. The request identifies a first conference participant of a conference as a follow-along participant for a second conference participant of the conference for which a whiteboard is enabled. A trigger associated with the first conference participant is identified. Responsive to the identified trigger, a second viewport is set for display at a device of the second conference participant. The second viewport is based on a first viewport into the whiteboard where the first viewport is displayed at a device of the first conference participant.

20 Claims, 9 Drawing Sheets

SELECTED FOLLOW-ALONG PARTICIPANTS FOR VIEWPORT SYNCHRONIZATION

FIELD

This application relates generally to whiteboard management, and more specifically, to synchronizing whiteboard viewports based on viewports of follow-along conference participants.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
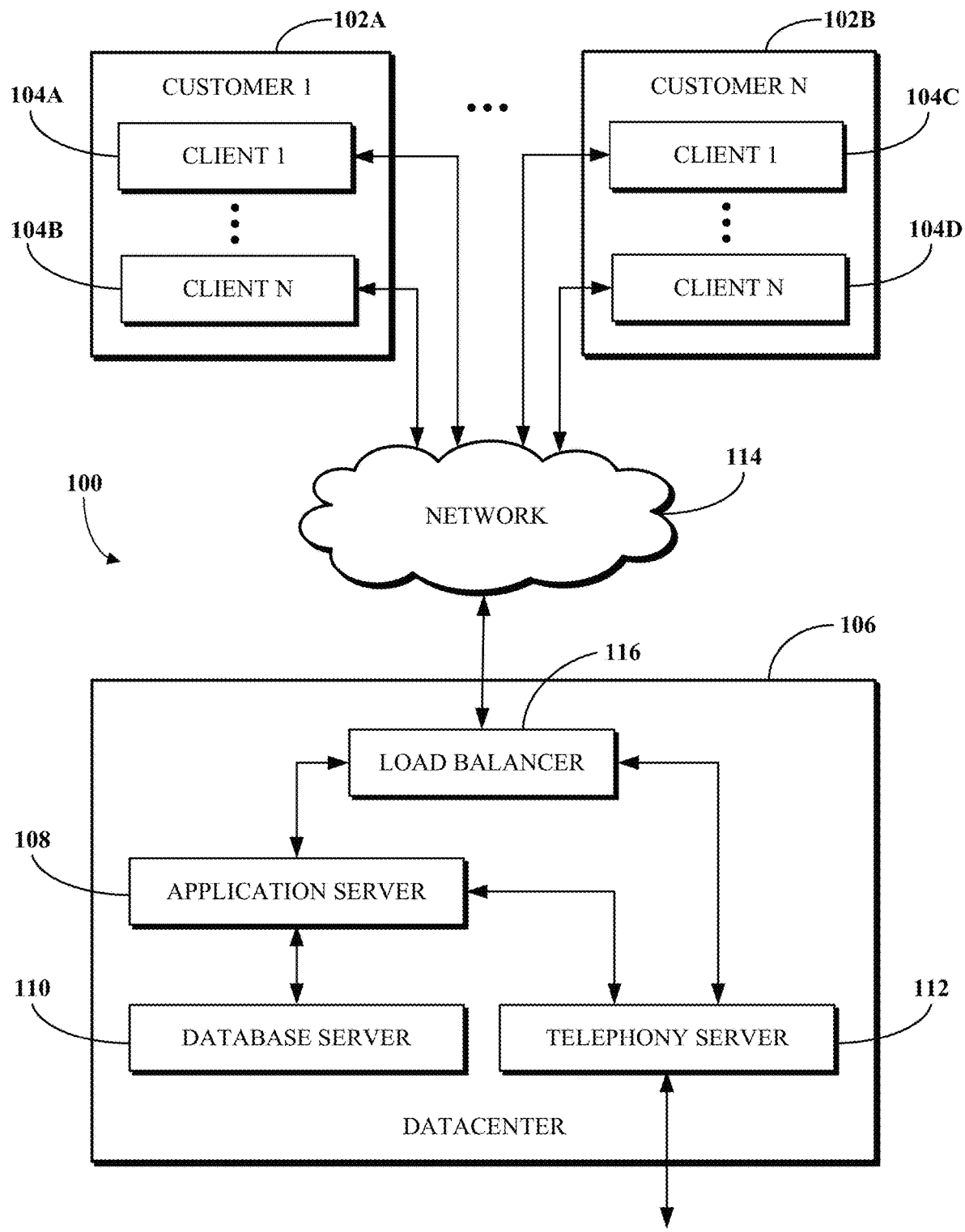
FIG. 1 is a block diagram of an example of an electronic computing and communications system.

Conferencing software, such as that of a conventional unified communications as a service (UCaaS) platform, may enable users to use whiteboards in conferences (e.g., virtual meetings). A whiteboard, also referred to as a digital whiteboard, is an online, interactive content collaboration space that enables many use cases. In one common example, a whiteboard enables users to collaborate remotely with one another on projects or ideas by adding and editing content. In another example, a whiteboard can be used by a teacher in an online classroom or by one or more panelists during a webinar (i.e., an online or virtual seminar) to collaboratively present content.

A whiteboard, for all practical purposes, is or may configurably be an infinite canvas. During a conference facilitated using conventional conferencing and whiteboard software, a conference participant may pan to or zoom in and out of any portion of the whiteboard independent of interactions with the whiteboard by other participants. The portion of the whiteboard that is displayed at a device of a participant is referred to as a viewport. Given the collaborative nature of whiteboard usage, different participants may, at any point in time during the conference, be editing or viewing different portions of the whiteboard. Thus, different participant devices may display different viewports.

Traditionally, a conferencing software does not synchronize the viewports of conference participants. That is, the conferencing software may not configure (e.g., set) the viewport of one conference participant based on the viewport of another conference participant. For example, the viewports of one or more conference participants are not synchronized with (e.g., not set to) the viewport of a speaking participant and/or based on the viewport of one or more selected participants.

To illustrate, in a conference intended for design review and attended by two presenters and twenty virtual participants, a first presenter may be describing front-end (i.e., user interface (UI)) aspects of a system whereas a second presenter may be describing back-end (e.g., service-side processing) aspects of the system. As such, each of the presenters may have a different viewport into a whiteboard that includes descriptions of the different aspects of the system. As the presenters go back-and-forth in their discussion, and to keep up with the discussion, the other participants may attempt to pan (e.g., scroll) to the part of the whiteboard pertinent (related) to the viewport of the current presenter. This can distract the participants from the content of the presentation.

Implementations of this disclosure address problems such as these by using the audio-visual components of a conference to modify the viewports of participants therewith freeing the participants to focus on the substantive content presented or discussed. That is, a software platform that provides conferencing and whiteboard services in accordance with the implementations of this disclosure can use data signals (e.g., audio signals) from the conference to provide a seamless experience with respect to whiteboards that is enabled in the conference. More generally, the software platform can change the viewports of conference participants (i.e., following-along participants) based on detected triggers associated with other participants (i.e., follow-along participants). To illustrate, the conferencing software can identify a current speaker and change the viewport of all other participants to match the viewport of the speaker (i.e., the follow-along participant).

A "follow-along participant," as used herein, is a participant the viewport of whom is used by the conferencing software to configure the viewport of other participants for whom the follow-along participant is selected (e.g., set as a follow-along participant). To be clear, the "viewport of a participant" means the "viewport into a whiteboard where the viewport is displayed on a device of the participant." A device of a follow-along participant is referred to herein as "follow-along device." A "following-along participant" of a follow-along participant, as used herein, means a participant whose viewport may be set based on the viewport of the follow-along participant.

In an example, only a subset of the participants may be designated as follow-along participants. In such a case, the conferencing software updates the viewports of other participants only based on the viewports of the follow-along participants. In another example, the conferencing software can present, to a participant, previews of viewports of one or more other participants. The participant can switch their viewport to match one of the previews.

In some implementations of synchronizing whiteboard viewports, a first conference participant of a conference that includes a whiteboard is identified. A first viewport into the whiteboard is identified. The first viewport is displayed at a device of the first conference participant. A second viewport is set based on the first viewport. The second viewport is displayed at a device of a second conference participant. In another implementation of synchronizing whiteboard viewports, a follow-along request is received. The follow-along request identifies a first conference participant of a conference as a follow-along participant for a second conference participant of the conference for which a whiteboard is enabled. A trigger associated with the first conference participant is identified. Responsive to the identified trigger, a second viewport is set for display (i.e., is displayed) at a device of the second conference participant. The second viewport is based on a first viewport into the whiteboard where the first viewport is displayed at a device of the first conference participant.

To describe some implementations in greater detail, reference is first made to examples of hardware and software structures used to implement whiteboard viewport synchronization. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
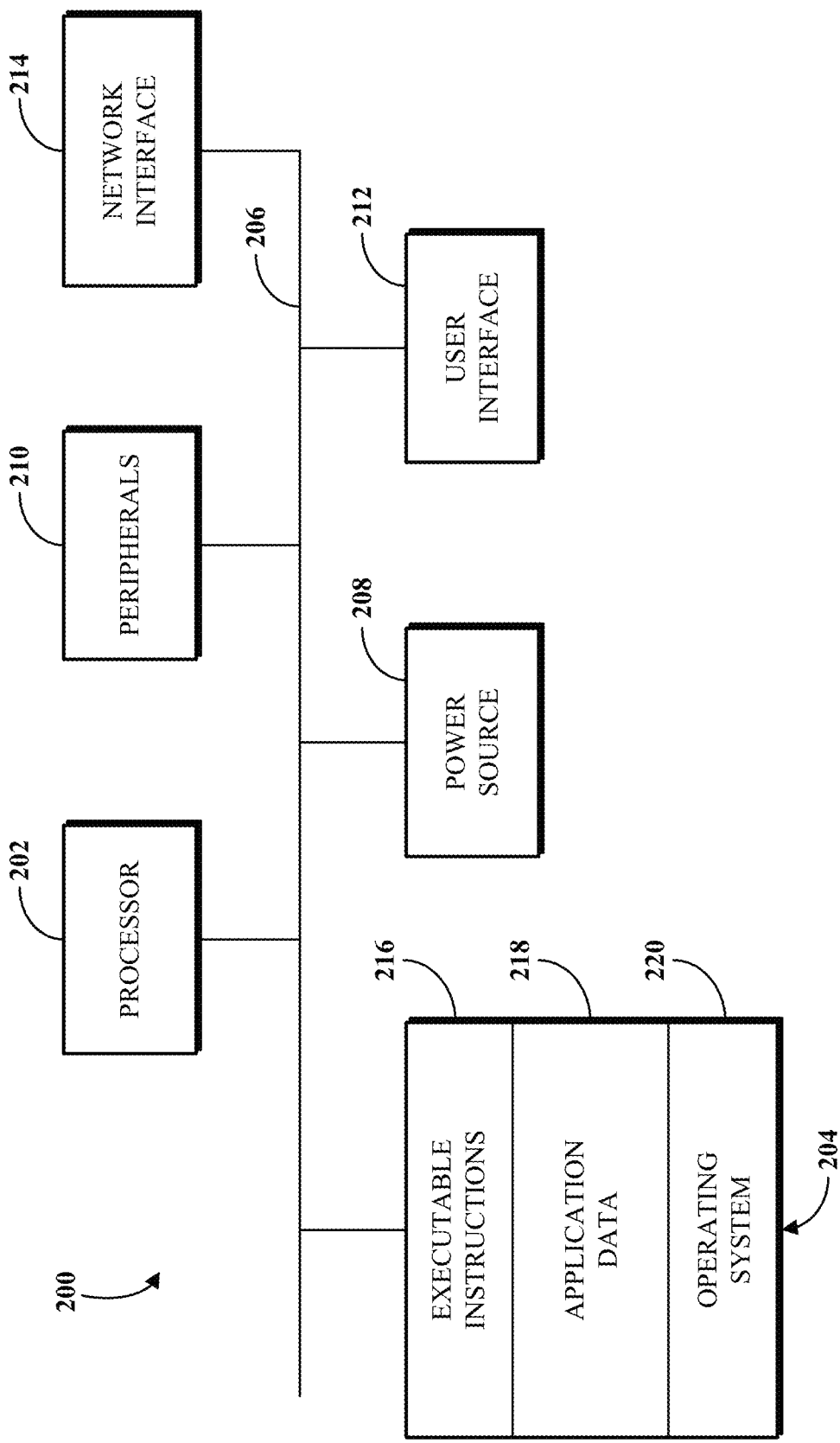
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a UI 212, a network interface 214, other suitable components, or a combination thereof. One or more of the memory 204, the power source 208, the peripherals 210, the UI 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The UI 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802. X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
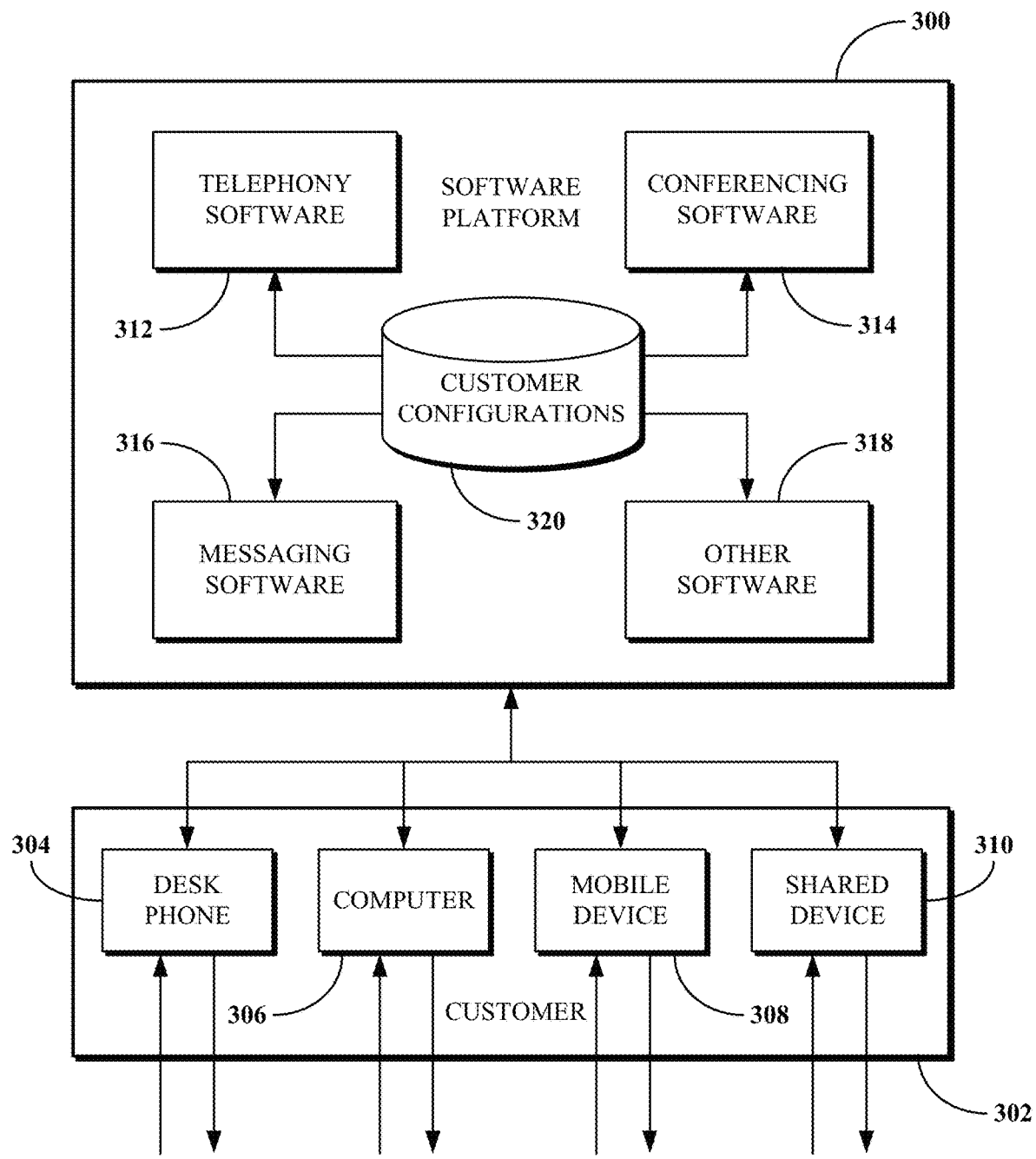
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include whiteboard synchronization software that can be used to configure the viewport of a following-along conference participant of a conference based on the viewport of a follow-along participant of the conference. In some such cases, the other software 318 may be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a UI element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
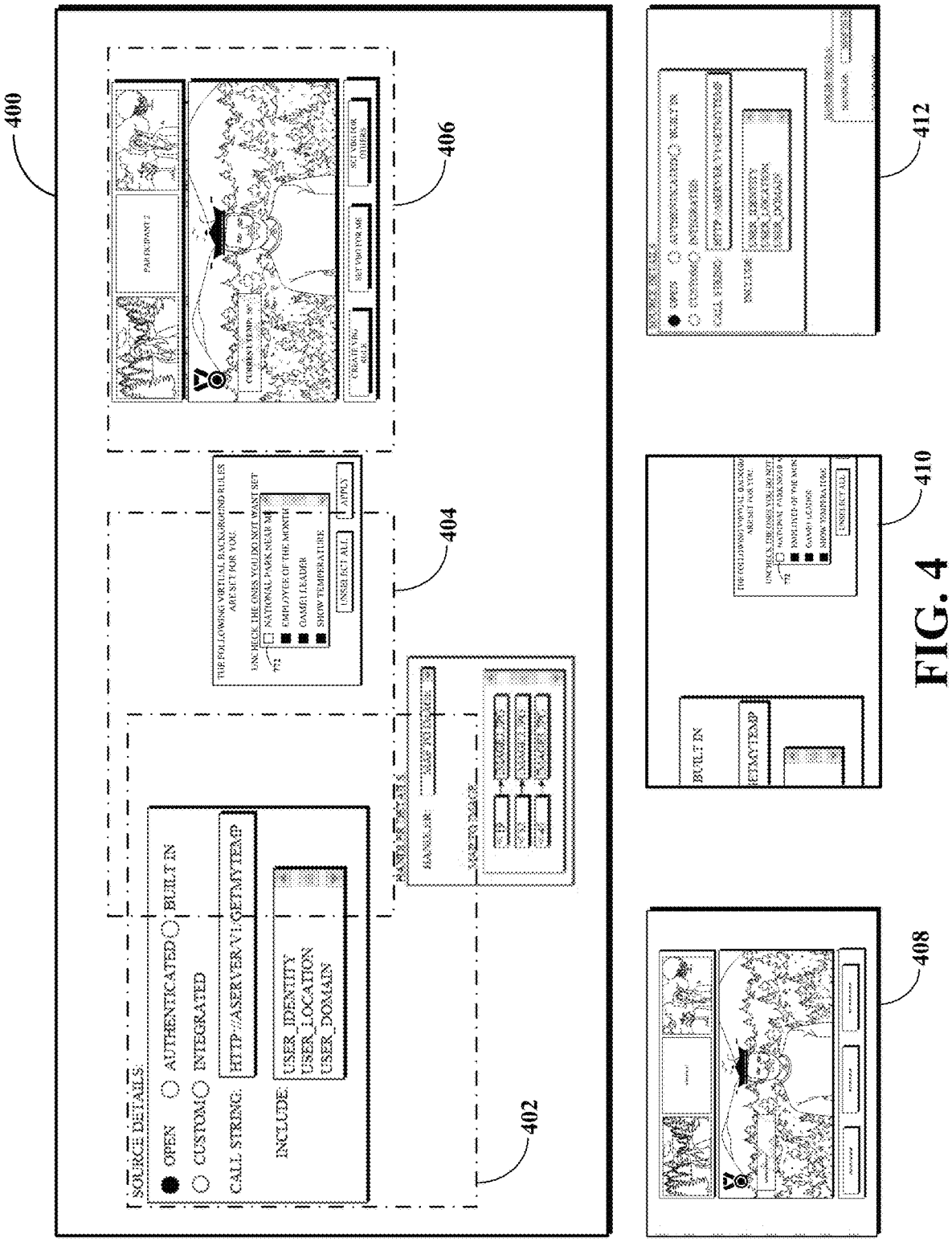
FIG. 4 illustrates an example of viewports of a whiteboard.

FIG. 4 illustrates an example of viewports of a whiteboard 400. FIG. 4 illustrates that three users are currently collaborating using, or currently viewing different portions of, the whiteboard 400. A first user is currently viewing (e.g., has) viewport 402, a second user is currently viewing viewport 404, and a third user is currently viewing viewport 406, which are displayed on displays 408, 410, and 412 of devices of the first user, the second user, and the third user, respectively. While not specifically shown in FIG. 4, the whiteboard 400 can include multiple pages and different users may be viewing different portions of the different pages. Thus, the viewports 402, 404, and 406 may correspond to the same page or different pages of the whiteboard 400.

Figure 5:
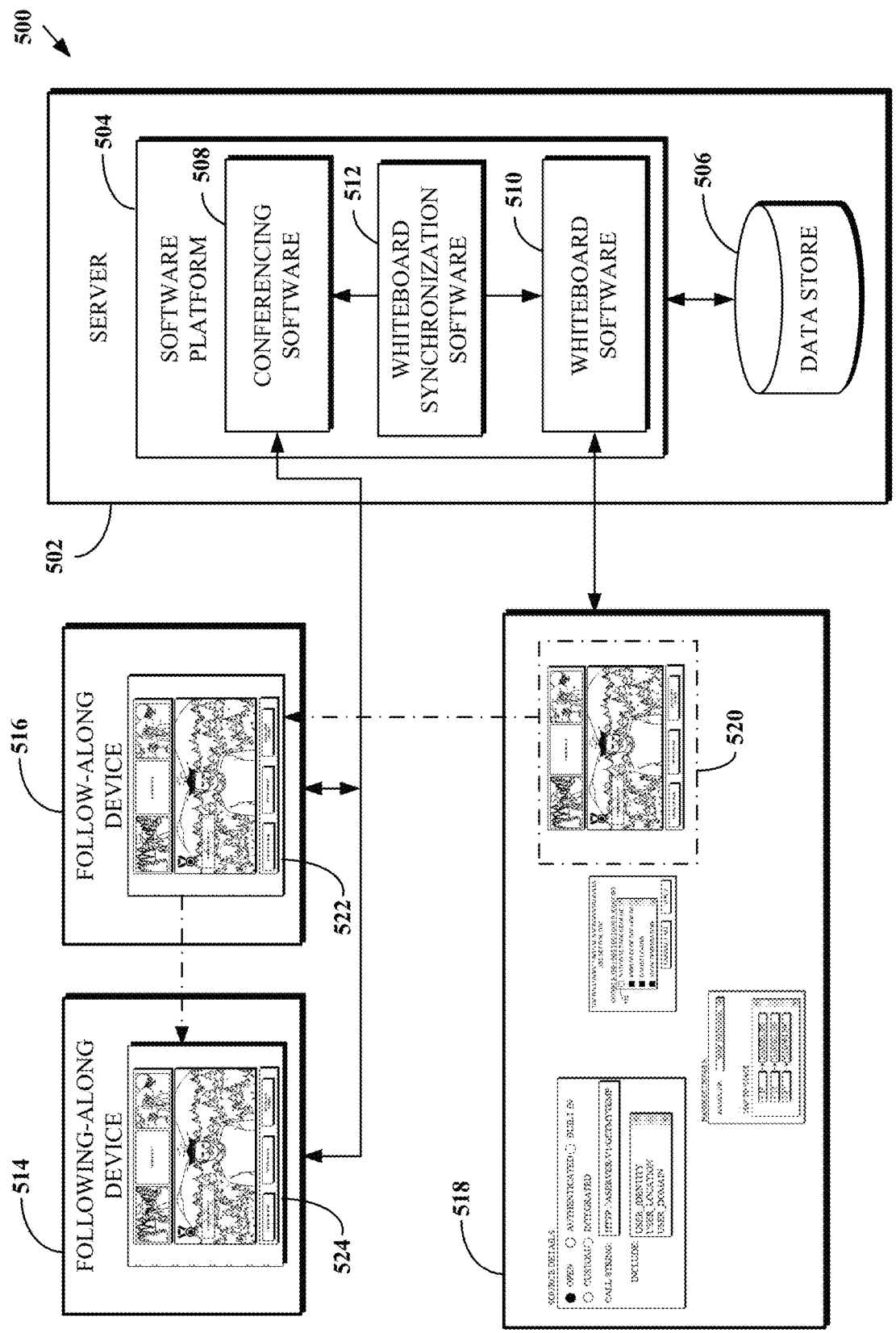
FIG. 5 is a block diagram of an example of a system for synchronizing whiteboard viewports based on viewports of follow-along participants.

FIG. 5 is a block diagram of an example of a system 500 for synchronizing whiteboard viewports based on viewports of follow-along participants. The system 500 includes a server 502 that enables users to participate in (e.g., virtually join) audio-visual conferences, also referred to as conferences. As shown, the server 502 implements or includes some or all of a software platform 504 and a data store 506. The server 502 can be one or more servers implemented by or included in a datacenter, such as the datacenter 106 of FIG. 1. While a single server 502 is shown, in some cases, multiple servers may be used to implement the software platform 504, for example, by different servers implementing different functionality or services of the software platform 504. The software platform 504, via the server 502, provides conferencing services (e.g., capabilities or functionality) via a conferencing software 508 and provides whiteboard services via a whiteboard software 510. The software platform 504 can be or can be part of the software platform 300 of FIG. 3. The conferencing software 508 can be variously implemented in connection with the software platform 504. In some implementations, the conferencing software 508 can be or can be integrated in the conferencing software 314 of FIG. 3. The whiteboard software 510 can be variously implemented in connection with the software platform 504. In some implementations, the whiteboard software 510 can be or can be integrated in the other software 318 of FIG. 3.

The whiteboard software 510 enables a virtual canvas that users of the software platform 504 (e.g., conference participants) may be configured (e.g., enabled or permitted) to access. Different permissions may be associated with different users of a whiteboard. To illustrate, and without limitations, some users may be permitted to modify the whiteboard, some users may be permitted to only view the contents of the whiteboard, and some users may be permitted to only comment on (e.g., add comments to) the whiteboard or content therein. Modifying the whiteboard can include one or more of adding content to the whiteboard, deleting content from the whiteboard, changing content of the whiteboard, or changing the arrangement of content in the whiteboard. Other permissions or combinations thereof are possible.

A user can modify the whiteboard by adding content (e.g., text, shapes, images, animations, or videos) to the whiteboard. The whiteboard software 510 maintains (e.g., stores), such as in the data store 506, locations of edited content or comments added to the whiteboard along with the respective users who added the content or made the comments. The whiteboard software 510 may display or cause to be displayed, at a device of a user, content of the viewport. To illustrate, and with reference to FIG. 4, in response to a user panning or scrolling to an area corresponding to the viewport 404 of the whiteboard 400 of FIG. 4, the whiteboard software 510 may cause the display of a device of the user to correspond to the display 410 of FIG. 4.

A conference enabled by the server 502 may be configured to include a whiteboard via the whiteboard software 510. For example, an audio-visual conference may be initiated (e.g., started), and a whiteboard may be introduced within the conference at some point thereafter. In another example, an audio-visual conference may be initiated via the whiteboard software 510. To illustrate, one or more users may be actively using (e.g., accessing, viewing, and/or editing) a whiteboard. One of the users may invoke an action via or otherwise in connection with the whiteboard to initiate a conference, for example, including the users currently using the whiteboard. As such, a whiteboard is first accessed and then an audio-video conference is initiated. Regardless of the order in which the audio-visual conference and whiteboard are initiated or otherwise used, the audio-video conference is said to be configured to include a whiteboard. Other ways of starting or using a conference that includes a whiteboard are possible.

A participant accesses the services of the software platform 504 via a device, which may include (e.g., execute or implement) a client application (e.g., a software or tool(s)) associated with the software platform 504. FIG. 5 illustrates that two participants are joined to a conference enabled by the software platform 504 via respective devices: a following-along device 514 and a follow-along device 516. A whiteboard 518 is also enabled for the conference. As can be appreciated, more or fewer devices than those illustrated in FIG. 5 may be connected to the software platform 504 at a given point in time. Additionally, the software platform 504 may potentially enable many (e.g., thousands) simultaneous conferences.

The user of the follow-along device 516 is selected as a follow-along participant. In an example, the conference participant corresponding to the following-along device 514 may select, as a follow-along participant, the participant corresponding to the follow-along device 516. In another example, the follow-along participant may be selected (as a follow-on participant) for the participant of the following-along device 514. That is, the selection of the follow-along participant is not made by the conference participant themselves. For example, the software platform 504 may automatically designate a host of the conference as a follow-along participant. In another example, at any time before the conference has started (e.g., at a time of scheduling the conference), or at any time during the conference, a privileged participant (e.g., a host or organizer of the conference) can select the participant associated with the follow-along device 516 as a follow-along participant for at least some of the participants of the conference.

The data store 506 stores data related to conference participants and whiteboards, as described herein. The data store 506 can be included in or implemented by a database server, such as the database server 110 of FIG. 1. The data store 506 can include data related to scheduled or ongoing conferences, invitees to these conferences, and any designated (e.g., selected) follow-along participants. The data store 506 can include one or more directories of registered participants that may include roles (e.g., manager, director, or executive) of different users of the software platform 504. The data store 506 may include whiteboard-related data, such as contents of whiteboards, metadata (e.g., attributes or tags) of whiteboards, permissions of conference participants with respect to whiteboards, participants who have viewed or interacted with whiteboards, and the like.

Figure 6:
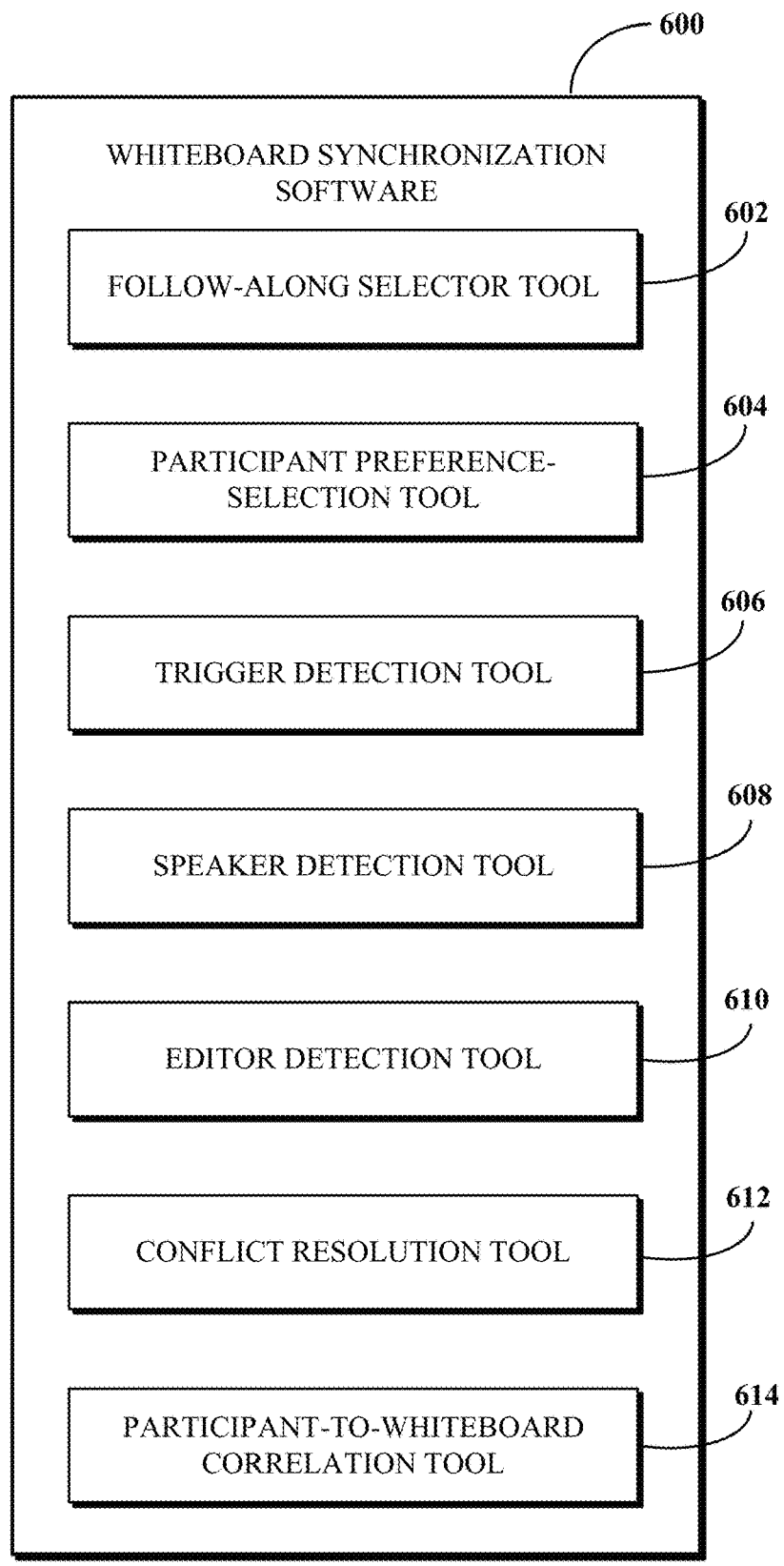
FIG. 6 is a block diagram of example functionality of a whiteboard synchronization software.

A whiteboard synchronization software 512, which is further described with respect to FIG. 6, can update or cause to be updated a display (i.e., a viewport) of a participant based on the viewport of a follow-along participant selected for or by the participant. To illustrate, and as further described herein, assume that a viewport 522 corresponding to a portion 520 of the whiteboard 518 is currently displayed at the follow-along device 516. In response to detecting a trigger associated with a follow-along participant (i.e., the participant associated with the follow-along device 516), the whiteboard synchronization software 512 can update or cause to be updated the display of the following-along device 514 to show the same viewport 524 as that of the viewport 522.

FIG. 6 is a block diagram of example functionality of a whiteboard synchronization software 600, which may, for example, be the whiteboard synchronization software 512 of FIG. 5. The whiteboard synchronization software 600 may be included in or work in conjunction with a software platform, such as the software platform 504 of FIG. 5. The whiteboard synchronization software 600 includes tools, such as programs, subprograms, functions, routines, subroutines, operations, executable instructions, and/or the like for, inter alia and as further described below, synchronizing whiteboard viewports based on viewports of follow-along conference participants. As described with respect to FIG. 5, the whiteboard synchronization software 600 may be included in a software platform that provides conferencing services and whiteboard services.

At least some of the tools of the whiteboard synchronization software 600 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the whiteboard synchronization software 600 includes a follow-along selector tool 602, a participant preference-selection tool 604, a trigger detection tool 606, a speaker detection tool 608, an editor detection tool 610, a conflict resolution tool 612, and a participant-to-whiteboard correlation tool 614. In some implementations, the whiteboard synchronization software 600 can include more or fewer tools. In some implementations, some of the tools may be combined, some of the tools may be split into more tools, or a combination thereof. The tools of the whiteboard synchronization software 600 are used to synchronize viewports of following-along participants based on viewports of follow-along participants. Each of the tools can be used separately, in conjunction with other one or more other tools, for such purpose.

The follow-along selector tool 602 can be used to set one or more default follow-along participants for one or more participants. In an example, a conference may be configured such that certain invitees or participants are designated as follow-along participants. The organizer (e.g. host or creator of the conference) may designate the follow-along participants. Having default designated follow-along participants frees other participants from having to actively participate in viewport modification at their devices.

The participant preference-selection tool 604 enables a participant to select one or more follow-along participants for themselves and/or for other participants while a conference is ongoing. The conference participant can use facilities (e.g., UIs or commands) of the participant preference-selection tool 604 to select follow-along conference participants. The participant preference-selection tool 604 may enable a participant to select an area-of-interest for conflict resolution. As further described below, areas-of-interests can be thought of as tie breakers. Operation of the participant preference-selection tool 604 is illustrated with respect to FIG. 8.

The trigger detection tool 606 identifies a trigger associated with a follow-along participant. The trigger detection tool 606 may include or work in conjunction with other specific trigger identifying tools (e.g., the speaker detection tool 608 and the editor detection tool 610) to identify the trigger. In response to an identified trigger, the trigger detection tool 606 may modify (e.g., update) the viewports of the following-along participants of the follow-along participant based on the viewport of the follow-along participant. That is, the identified trigger corresponds to (e.g., is used to identify) a follow-along participant. The follow-along participant may have (e.g., may be associated with) one or more following-along participants. The respective viewports of these following-along participants are updated based on the viewport of the follow-along participant.

In an example, the trigger detection tool 606 modifies the viewports of following-along participants only if the follow-along participant is currently sharing their viewport. To illustrate, while one panelist may be speaking, another follow-along participant may be preparing for their turn to speak by making changes to a portion of the whiteboard. To prepare, the other follow-along participant may turn off whiteboard sharing. As such, while whiteboard sharing is turned off, the whiteboards of follow-along participants are not updated in response to detecting a trigger associated with the follow-along participant.

In some situations, multiple triggers may be contemporaneously identified. The trigger detection tool 606 may use the conflict resolution tool 612 to identify at most one follow-along participant from amongst multiple follow-along participants identified based on the contemporaneous triggers. Contemporaneous triggers are triggers that are determined to have occurred within a predefined time window (e.g., 1 second or 2 seconds).

The speaker detection tool 608 identifies that a follow-along participant is currently speaking. The speaker detection tool 608 may receive audio streams from devices of conference participants (i.e., audio streams associated with participants). If the speaker detection tool 608 determines, based on an analysis of an audio stream associated with a participant, that the participant (who is designated as a follow-along participant) is speaking, the speaker detection tool 608 notifies the trigger detection tool 606 that a trigger associated with the participant is identified. The notification may specifically indicate a trigger type (e.g., a "speaking trigger") and includes an identifier of the speaking participant.

In an example, based on identifying speech in a stream associated with a follow-along participant, the speaker detection tool 608 can determine (e.g., infer) that the follow-along participant is speaking. In an example, voice fingerprints may be associated with at least some participants in a data store, such as the data store 506 of FIG. 5. When an audio stream associated with a participant is received, the speaker detection tool 608 may use voice separation techniques to associate different detected voices with different speakers. If a detected voice (e.g., a fingerprint generated therefor) matches (at least to a degree that is greater than a minimal match threshold) a voice fingerprint of the follow-along participant associated with the audio stream, then the speaker detection tool 608 identifies that the follow-along participant is currently speaking.

The editor detection tool 610 identifies that a follow-along participant is currently modifying or interacting with the whiteboard. The editor detection tool 610 may receive notifications from a whiteboard software, such as the whiteboard software 510 of FIG. 5, that a participant has modified the whiteboard or has interacted with the whiteboard (such as by changing their viewport). In an example, if the participant is a follow-along participant, then the editor detection tool 610 notifies the trigger detection tool 606 that a trigger associated the participant is identified. The notification may specifically indicate a trigger type (e.g., an "editing trigger") and includes an identifier of the participant who is editing the whiteboard.

The conflict resolution tool 612 can be used to select at most one follow-along participant from amongst several follow-along participants identified based on contemporaneous triggers. The conflict resolution tool 612 notifies the trigger detection tool 606 of the at most one follow-along participant.

In an example, respective priorities may be associated with types of triggers. For example, speaking triggers may have higher priority than editing triggers. As such, if a first follow-along participant is speaking and a second follow-along participant is editing, the first follow-along participant is selected as the currently active follow-along participant for updating viewports of other participants.

In an example, respective priorities may be associated with different follow-along participants. For example, a participant designated as a panelist may have a higher priority than a non-panelist. In another example, a participant identified as an executive may be associated with a higher priority than a non-executive.

As described herein, different participants may identify different preference ordering of follow-along participants. As such, the conflict resolution tool 612 can identify follow-along participants per following-along participant. To illustrate, a first participant may have set a preference for a first follow-along participant and a second participant may have set a preference for a second follow-along participant. In response to identifying contemporaneous triggers associated with the first and the second follow-along participants, the conflict resolution tool 612 identifies the first follow-along participant for the first participant and identifies the second follow-along participant for the second participant.

In another example, areas-of-interest of the whiteboard can be used as tie breakers. To illustrate, a participant may have selected two or more follow-along participants and may have identified an area-of-interest in the whiteboard. Based on identifying triggers associated with at least two of the two or more follow-along participants, the conflict resolution tool 612 can select the one follow-along participant whose viewport has the largest area of overlap with the area of interest.

The whiteboard correlation tool 614 maintains associations between participants and viewports (i.e., "viewport-participant association"). That is, for each participant who is viewing a whiteboard (i.e., a portion thereof), the whiteboard correlation tool 614 associates data indicative of the viewport with the participant. An association between a participant and a viewport can equivalently mean or include an association between a device of the participant and the viewport. As a participant pans, zooms, or performs other actions that result in a modification to the viewport of the participant, the whiteboard correlation tool 614 can receive indications of such actions. The whiteboard correlation tool 614 uses the indications to update the viewport-participant associations.

The data indicative of the viewport can be a position within the whiteboard, such a Cartesian coordinate point (x, y) within the whiteboard with respect to another point identified as an origin point (0, 0) of the whiteboard. The position can be indicative of a top-left corner of the portion of the whiteboard that is displayed on a display of the participant. In another example, the position can be the center of the displayed portion. The data indicative of the viewport can further include dimensions (e.g., width and height) of the displayed portion. As mentioned above, the whiteboard might include multiple pages. As such, the position within the whiteboard may be given by the tuple (x, y, p), where p indicates the page number and (x, y) are the position within the page.

Figure 7:
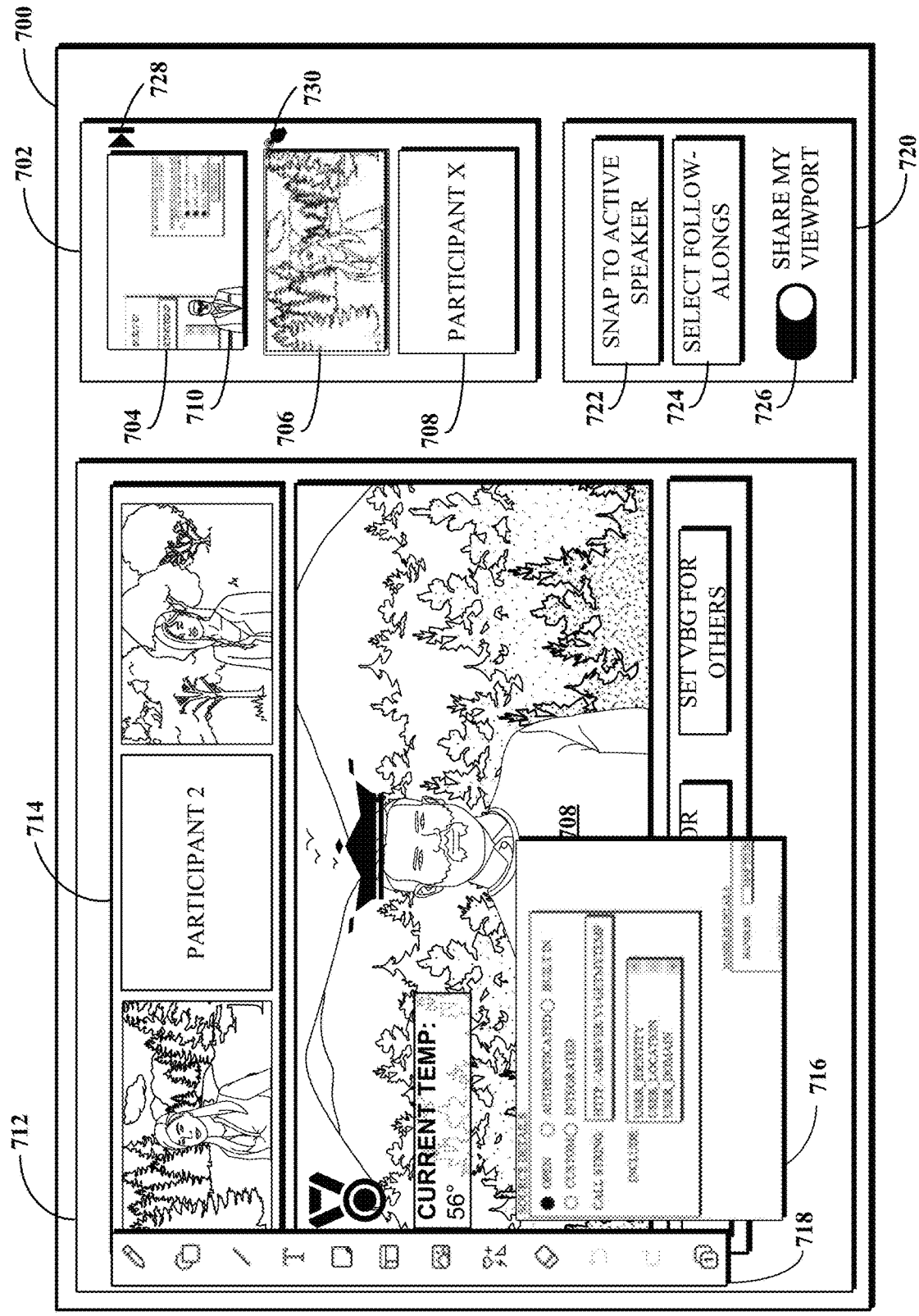
FIG. 7 is an example of a user interface that illustrates whiteboard synchronization.

FIG. 7 is an example of a UI 700 that illustrates whiteboard synchronization. The UI 700 can be displayed at a participant device of a participant of a conference, such as the following-along device 514 or the follow-along device 516 of FIG. 5. The participant on whose device the UI 700 is displayed is referred to as a current participant. The UI 700 can be displayed or caused to be displayed by a client application available or executing at the participant device and that works in conjunction with a software platform, such as the software platform 504 of FIG. 5. In some implementations, the UI 700 can include more, fewer, or other UI elements than those described herein. In some implementations, the UI elements may be arranged differently from the arrangement shown in FIG. 7.

The UI 700 illustrates that three conference participants are connected to a conference for which a whiteboard is enabled. Each of the conference participants can be represented by a respective tile, such as a participant 704 tile, a participant 706 tile, and a participant 708 tile, respectively. The tiles may be displayed in a participant panel 702, which can be a scrollable list. In another example, the participant panel 702 may only include tiles for participants selected as follow-along participants. For brevity and ease of description, statements such as "the <participant X><verb>" should be understood to mean that "the participant represented by the participant X tile <verb>."

The UI 700 illustrates that the current participant is the participant 708. That is, the UI 700 is displayed at a device of the participant 708. The UI 700 illustrates that some of the participants have turned on cameras of their respective devices and some of the participants may be sharing their whiteboard viewports. Specifically, the participant 704 is sharing their viewport and has their camera turned on. As such, the participant 704 tile shows the viewport of that participant and an overlaid likeness 710 of the participant, as captured by a camera of the device of the participant 704. The participant 706 is not sharing their viewport but has turned on their camera (and may have enabled a virtual background). The participant 708 (i.e., the current participant) neither has their camera turned on nor is sharing their viewport. As such, an identification string "PARTICIPANT X" is displayed in the participant 708 tile.

The UI 700 includes a whiteboard viewing area 712 that includes a primary area 714 and a secondary area 716. As can be seen, the primary area 714 may be larger than the secondary area 716. One of the primary area 714 and the secondary area 716 can be used to display a current viewport of the current participant (i.e., the participant 708 in this case) and the other area is used to display the viewport of a current (e.g., identified) follow-along participant (i.e., a follow-along viewport). In the whiteboard viewing area 712, the participant 708 can switch the displays of the current viewport and follow-along viewport, such as by double clicking the secondary area 716. The whiteboard viewing area 712 is shown as also including a whiteboard toolbar 718 that includes tools usable by the participant 708 to edit (if permitted) the whiteboard via at least one of the primary area 714 or the secondary area 716.

While not specifically shown in FIG. 7, devices of the different participants may be configured to have different resolutions, different aspect ratios, or different orientations (e.g., portrait vs. landscape). As such, modifying the viewport of a following-along participant may include adjusting at least one of a resolution, an aspect ratio, or a zoom level of the viewport of the follow-along participant to match those of the display of the follow-along participant. To illustrate, assume that the follow-along viewport is to be displayed in the primary area 714, then the display of the follow-along viewport may be adjusted so that all of the contents of the follow-along viewport are shown in the primary area 714. However, that may mean that less than 100% percent of the primary area 714 is used (i.e., the viewport may not cover 100% of the available space in the primary area 714).

A conference participant may have available commands, such as one or more of the commands 720, that can be used for, or in conjunction with, whiteboard follow along. The commands 720 is shown as including the commands 722-726. However, more or fewer commands may be available. A whiteboard synchronization software, such as the whiteboard synchronization software 512 of FIG. 5 or the whiteboard synchronization software 600 of FIG. 6, may cause the commands 720 to be presented on a device of the conference participant. The commands 720 may be presented in any number of ways and may be presented using different user control elements (e.g., buttons or menu items). A respective user flow (not illustrated) may be associated with each of the commands 720 for an optimal user experience. In an example, the commands presented to the conference participant may depend on the configuration (e.g., permissions, privileges, or role) of the conference participant.

The command 722, when invoked by a conference participant, may cause the whiteboard synchronization software to associate speaking triggers with the current participant. When a speaking trigger is identified, the whiteboard viewing area 712 (i.e., one of the primary area 714 or the secondary area 716) is configured (e.g., set or updated) to reflect the viewport of the speaking participant. The command 724, when invoked by the current participant, may cause the whiteboard synchronization software to display a UI, such as the UI 800 described with respect to FIG. 8, that enables the current participant to select one or more follow-along participants and set participant preference-selection rules.

The command 726 is a toggle that enables the current participant to share or stop sharing their current viewport with other participants. When toggled to the ON state by the current participant, the command 726 may cause the whiteboard synchronization software to display the viewport of the current participant to the other participants of the conference; and when toggled to the OFF state by the current participant, the command 726 may cause the whiteboard synchronization software to stop displaying the viewport of the current participant to the other participants of the conference. When the viewport of the current participant is being shared with other participants, the participant 708 tile displayed on devices of participants will show the current viewport.

The UI 700 also illustrates that commands related to whiteboard viewport sharing may be associated with participant tiles. Which commands are shown in association with which tiles may depend on whether the participant of that tile is or is not sharing their viewport with other participants.

A command 728 may be available for tiles associated with participants that are sharing their viewports. The command 728 may be referred to as a "take me there" command. When invoked by the current participant, the command 728 causes the viewport of the current participant to change to that of the participant 704. To illustrate, assume that the current participant is a professor and that the participant 704 is a student. The student wants to ask a question about a part of the whiteboard that the professor discussed 20 minutes earlier. The professor, who is a follow-along participant for the rest of the class (i.e., all other participants), can click the command 728, which causes the viewport of the professor to change to that of the student, and which in turn changes the viewports of all the students. As another illustration, the current participant may be a conference facilitator where the attendees are grouped into breakout rooms where each of the breakout room corresponds to a tile in the participant panel 702. By monitoring the viewport previews in the tiles, the facilitator may determine that a certain room requires help. The facilitator may use the command 728 associated with the breakout room.

A command 730 can be available for tiles of participants (other than the current participant) who are not currently sharing their viewports. When invoked by the current participant, the command 730 causes a request to be transmitted to the participant associated with that tile, such as the request described with respect to FIG. 9.

In an example, when a trigger is identified in association with a conference participant, the tile associated with that participant may be highlighted. As such, in some examples, triggers may also be identified for participants who may not be follow-along participants. That a tile is highlighted can mean, for example, that a colored border may be displayed around the tile. However, other highlights are possible. In response to noticing the highlight, the current participant may invoke the command 728 associated with the highlighted tile.

Figure 8:
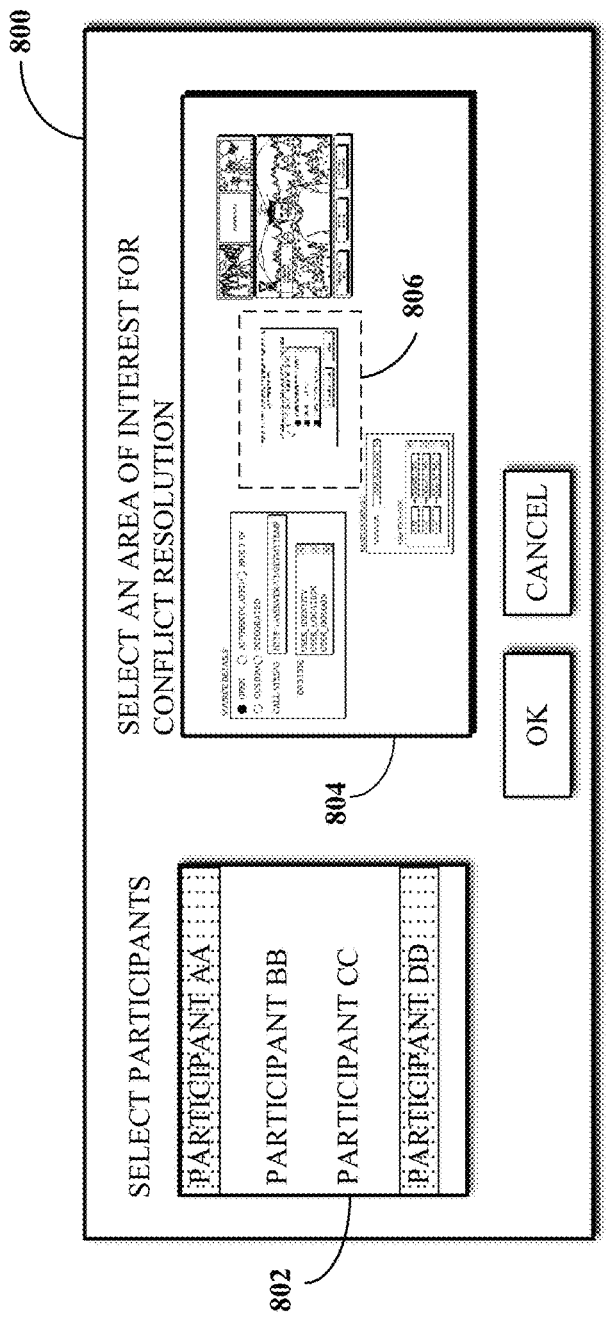
FIG. 8 is an example of a user interface for follow-along participant selection.

FIG. 8 is an example of a UI 800 for follow-along participant selection. The UI 800 includes a list 802 of participants of a conference that a current participant can use to select follow-along participants. FIG. 8 illustrates (via the dotted pattern) that the current participant has selected PARTICIPANT AA and PARTICIPANT DD as follow along participants from the list 802. While not specifically shown in FIG. 8, the UI 800 can include facilities that the current participant can use to select an ordering (e.g., associate respective priorities) with the selected follow-along participants, which can be used for conflict resolution.

The UI 800 is also illustrated by example as including a whiteboard map 804, which may be a snapshot of the current contents of the whiteboard. The current participant can use the whiteboard map 804 to select one or more areas-of-interest, such as an area-of-interest 806. To select an area on interest, the current participant may simply be able to draw a box over the whiteboard map 804 indicating the area-of-interest. As described above, areas-of-interest can be used for conflict resolution. More generally, any rules and preferences configured via the UI 800 can be considered to be participant preference-selection rules that can be used for conflict resolution.

Figure 9:
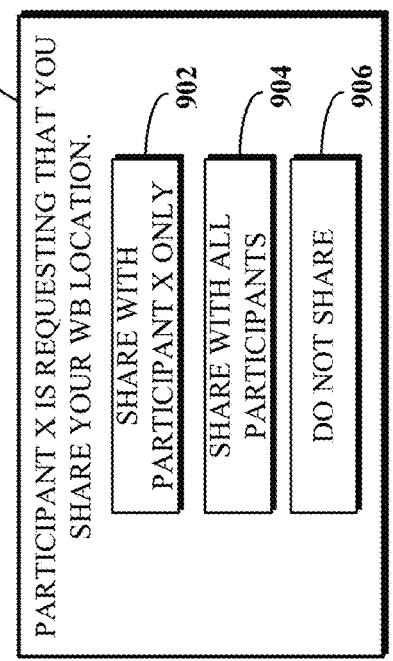
FIG. 9 is an example of a user interface for viewport sharing.

FIG. 9 is an example of a UI 900 for viewport sharing. The UI 900 may be displayed at a device of a participant in response to a request from another participant (i.e., a requesting participant) that the participant share their viewport with the other participant. The UI 900 may be displayed in response to the other participant invoking, for example, the command 730 of FIG. 7. In response to the request, the participant can select an option 902 to share their viewport with only the requesting participant; can select an option 904 to share their viewport with all participants; or can select an option 906 to reject the request and not share their viewport.

If the participant selects the option 902, then the tile associated with the participant and displayed at the device of the requesting participant can start reflecting the viewport of the participant. However, the tiles associated with the participant and displayed at devices of all other participants (other than the requesting participant) would not show the viewport of the participant. If the participant selects the option 904, then the tiles associated with the participant and displayed at devices of all participants would show the viewport of the participant.

Figure 10:
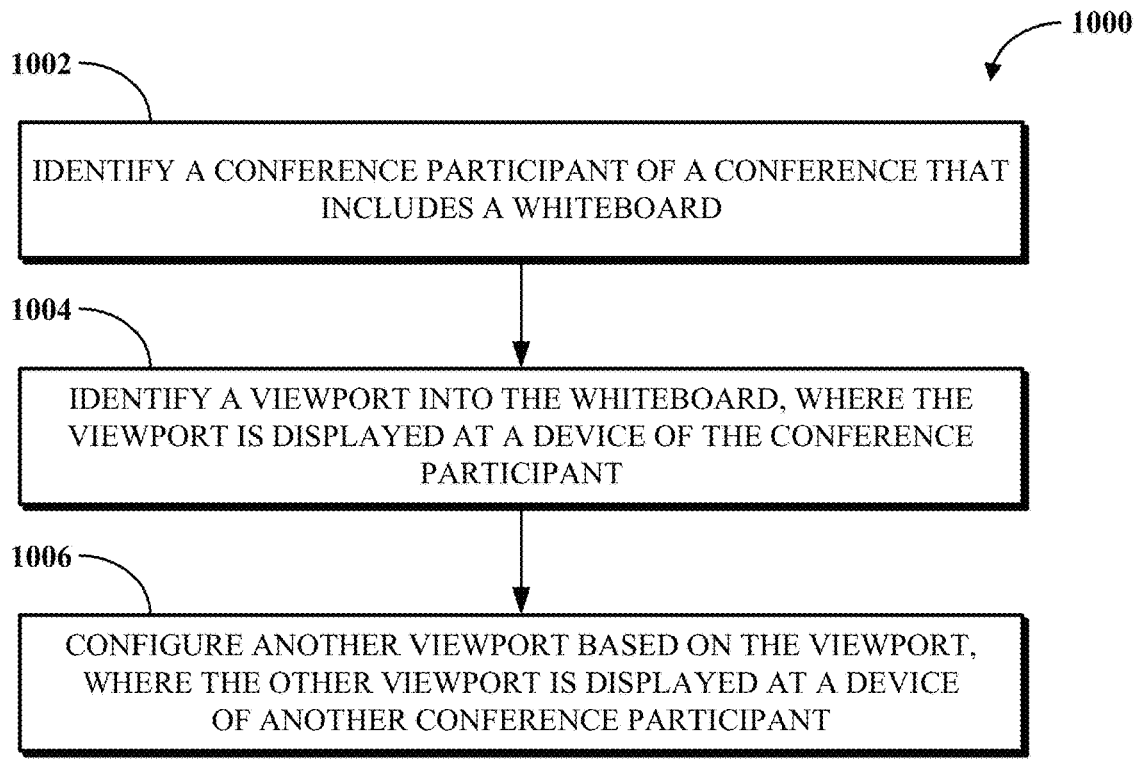
FIG. 10 is a flowchart of an example of a technique for setting a viewport into a whiteboard for a conference participant based on the viewport of another conference participant.

To further describe some implementations in greater detail, reference is next made to examples of techniques which may be performed for synchronizing whiteboard viewports of conference participants. FIG. 10 is a flowchart of an example of a technique 1000 for setting a viewport into a whiteboard for a conference participant based on the viewport of another conference participant.

The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

At 1002, a conference participant (i.e., a first conference participant) of a conference that includes a whiteboard is identified (e.g., selected). The first conference participant can be identified based on a trigger associated with the first conference participant. In an example, the first conference participant can be identified based on speech in an audio stream received from the device of the first conference participant. In an example, the first conference participant can be identified based on an edit to the whiteboard received from the device of the first conference participant. In an example, the first conference participant can be identified based on a request to configure the first conference participant as a follow-along participant. For example, the first conference participant can be identified as a default follow-along participant.

At 1004, a viewport (i.e., a first viewport) into the whiteboard is identified. The first viewport may be displayed at a device of the first conference participant. At 1006, another viewport (i.e., a second viewport) is configured (e.g., set) based on the first viewport. The second viewport can be displayed at a device of the second conference participant. A whiteboard synchronization software may identify a position (e.g., an (x, y) position) of the first viewport within the whiteboard. Extents (e.g., a width and a height) of the viewport and a zoom factor are also identified. The whiteboard synchronization software configures the second viewport using the position, extents, and zoom factor. The whiteboard synchronization software may transmit a command to an application executing at the device of the second conference participant including the position, extents, and zoom factor, which causes the application to configure the second viewport according to the position, extents, and zoom factor.

In an example, the technique 1000 can further include identifying, based on an audio stream received from a device of a third conference participant, that the third conference participant is speaking. The technique 1000 determines whether to configure the second viewport to be based on a third viewport corresponding to the third conference participant, wherein the determination is based on whether the third conference participant is configured as a follow-along participant. If the third conference participant is not a follow-along participant, then the second viewport of the second conference participant is not set using the viewport of the third conference participant. However, even if the third conference participant is a follow-along participant, the second viewport of the second conference participant may still not be set. As described above, multiple contemporaneous triggers may be identified and conflict resolution may be performed to determine whether the second viewport is to be updated.

Figure 11:
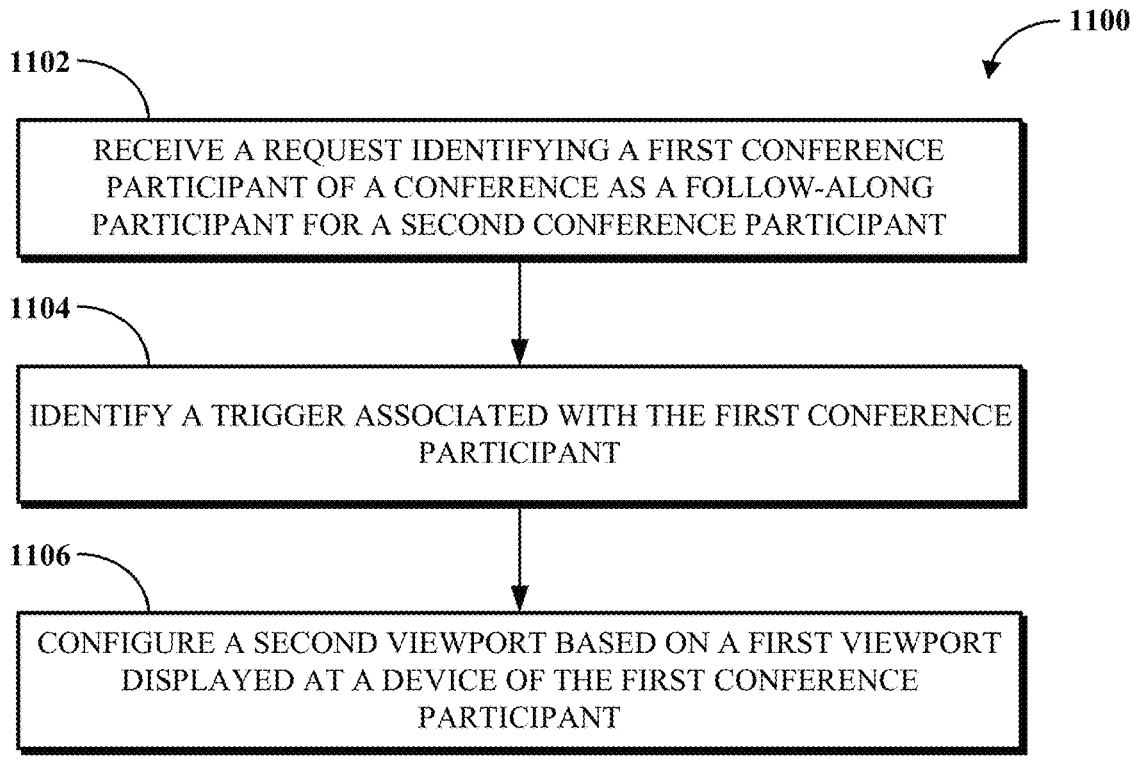
FIG. 11 is a flowchart of an example of a technique for setting a viewport into a whiteboard for a conference participant based on the viewport of a selected follow-along participant.

FIG. 11 is a flowchart of an example of a technique 1100 for setting a viewport into a whiteboard for a conference participant based on the viewport of a selected follow-along participant. The technique 1100 can be executed using computing devices, such as the systems, hardware, and software described with respect to FIGS. 1-9. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

At 1102, a follow-along request (i.e., a first request) is received. The follow-along request identifies a first conference participant of a conference as a follow-along participant for a second conference participant of the conference for which a whiteboard is enabled. In an example, the follow-along request can be received from the device of the second conference participant.

At 1104, a trigger associated with the first conference participant is identified. In an example, identifying the trigger can include identifying speech in an audio stream received from the device of the first conference participant. In an example, identifying the trigger can include identifying that an edit to the whiteboard is received from the device of the first conference participant. At 1106, and based on the identified trigger, a second viewport is configured based on a first viewport into the whiteboard. The second viewport is to be displayed at a device of the second conference participant; and the first viewport is displayed at a device of the first conference participant.

The technique 1100 can simultaneously display at the device of the second conference participant respective viewports of at least a subset of conference participants of the conference. In an example, the technique 1100 can include receiving, from the device of the second conference participant, a second request (i.e., a second follow-along request) identifying a third conference participant. A third viewport can be set based on a fourth viewport into the whiteboard and based on the second follow-along request. The fourth viewport is displayed at a device of the third conference participant; and the third viewport can be displayed at the device of the second conference participant in addition to the second viewport. In an example, the technique 1100 can include receiving, from the device of the second conference participant, a request to display a portion of the whiteboard. The portion of the whiteboard can be displayed at the device of the second conference participant. The portion of the whiteboard can be displayed at the device of the second conference participant in addition to the second viewport.

In an example, respective contemporaneous triggers associated with at least two conference participants can be identified. One of the least two conference participants can be identified (e.g., selected or chosen) based on a participant preference-selection rule. A viewport can be displayed at a device of the second conference participant based on a viewport into the whiteboard that is displayed at a device of the identified one of the least two conference participants.

For simplicity of explanation, the techniques 1000 and 1100 of FIGS. 10 and 11 are each depicted and described herein as a respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes receiving a first request identifying a first conference participant of a conference as a follow-along participant for a second conference participant of the conference, where a whiteboard is enabled for the conference. The method also includes identifying a trigger associated with the first conference participant. The method also includes configuring, based on the trigger and for display at a device of the second conference participant, a second viewport based on a first viewport into the whiteboard, where the first viewport is displayed at a device of the first conference participant. Other embodiments of this aspect include corresponding computer systems, apparatus, and computer programs recorded on one or more computer storage devices, each configured to perform the actions of the methods.

Implementations may include one or more of the following features. The method where identifying the trigger may include identifying speech in an audio stream received from the device of the first conference participant. Identifying the trigger may include identifying that an edit to the whiteboard is received from the device of the first conference participant.

The method may include receiving, from the device of the second conference participant, a second request identifying a third conference participant; and displaying, at the device of the second conference participant, a third viewport based on a fourth viewport into the whiteboard. The fourth viewport may be displayed at a device of the third conference participant and the third viewport may be displayed at the device of the second conference participant in addition to the second viewport.

The method may include receiving, from the device of the second conference participant, a request to display a portion of the whiteboard; and displaying, at the device of the second conference participant, the portion of the whiteboard. The portion of the whiteboard can be displayed at the device of the second conference participant in addition to the second viewport. The method may include simultaneously displaying at the device of the second conference participant respective viewports of at least a subset of conference participants of the conference. The first request can be received from the device of the second conference participant. The method can include identifying respective contemporaneous triggers associated with at least two conference participants; in response to identifying the respective contemporaneous triggers, identifying one of the least two conference participants based on a participant preference-selection rule; and displaying, at a device of the second conference participant, a viewport based on a viewport into the whiteboard that is displayed at a device of the identified one of the least two conference participants. Implementations of the described techniques may include hardware, a method or process, or computer software on a computer-accessible medium.

One general aspect includes a device. The device also includes a memory. The device also includes a processor, the processor can be configured to perform instructions stored in the memory to receive a first request identifying a first conference participant of a conference as a follow-along participant for a second conference participant of the conference, where a whiteboard is enabled for the conference; identify a trigger associated with the first conference participant; and configure, based on the trigger and for display at a device of the second conference participant, a second viewport based on a first viewport into the whiteboard, where the first viewport is displayed at a device of the first conference participant. Other embodiments of this aspect include corresponding computer systems, apparatus, and computer programs recorded on one or more computer storage devices, each configured to perform the actions of the methods.

Implementations may include one or more of the following features. The device where the instructions to identify the trigger may include instructions to identify speech in an audio stream received from the device of the first conference participant. The instructions to identify the trigger may include instructions to identify that an edit to the whiteboard is received from the device of the first conference participant. The processor can be further configured to execute instructions stored in the memory to receive, from the device of the second conference participant, a second request identifying a third conference participant; and display, at the device of the second conference participant, a third viewport based on a fourth viewport into the whiteboard, where the fourth viewport is displayed at a device of the third conference participant, and where the third viewport is displayed at the device of the second conference participant in addition to the second viewport.

The processor can be further configured to execute instructions stored in the memory to receive, from the device of the second conference participant, a request to display a portion of the whiteboard; and display, at the device of the second conference participant, the portion of the whiteboard, where the portion of the whiteboard is displayed at the device of the second conference participant in addition to the second viewport.

The processor can be further configured to execute instructions stored in the memory to simultaneously display at the device of the second conference participant respective viewports of at least a subset of conference participants of the conference. The first request can be received from the device of the second conference participant. The processor can be further configured to execute instructions stored in the memory to identify respective contemporaneous triggers associated with at least two conference participants; identify one of the least two conference participants based on a participant preference-selection rule; and display, at a device of the second conference participant, a viewport based on a viewport into the whiteboard that is displayed at a device of the identified one of the least two conference participants. Implementations of the described techniques may include hardware, a method or process, or computer software on a computer-accessible medium.

One general aspect includes a non-transitory computer readable medium storing instructions operable to cause one or more processors to perform operations that include receiving a first request identifying a first conference participant of a conference as a follow-along participant for a second conference participant of the conference, where a whiteboard is enabled for the conference. The operations also include identifying a trigger associated with the first conference participant. The operations also include configuring, based on the trigger and for display at a device of the second conference participant, a second viewport based on a first viewport into the whiteboard, where the first viewport is displayed at a device of the first conference participant. Other embodiments of this aspect include corresponding computer systems, apparatus, and computer programs recorded on one or more computer storage devices, each configured to perform the actions of the methods.

Implementations may include one or more of the following features. The non-transitory computer readable medium where identifying the trigger may include identifying speech in an audio stream received from the device of the first conference participant. Identifying the trigger may include identifying that an edit to the whiteboard is received from the device of the first conference participant. The first request may be received from the device of the second conference participant. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, from a device of a second conference participant, a first request designating a first conference participant of a conference as a follow-along participant for the second conference participant of the conference, wherein a whiteboard is enabled for the conference and two or more conference participants are potential follow-along participants available for designation by the second conference participant;
identifying a trigger associated with the first conference participant,
wherein in response to identifying respective contemporaneous triggers associated with at least two conference participants, identifying the trigger comprises:
selecting the first conference participant based on a participant preference-selection rule that identifies which follow-along participant determines a viewport for setting a second viewport;

configuring, based on the trigger and for display at a device of the second conference participant, the second viewport based on a first viewport into the whiteboard, wherein the first viewport is displayed at a device of the first conference participant;

in response to identifying a viewport change associated with another conference participant not designated as a follow-along participant for the second conference participant, omitting configuring the viewport for the second conference participant based on the viewport change; and receiving, from the second conference participant, a selection of an area of interest within the whiteboard, wherein selecting the first conference participant based on the participant preference-selection rule comprises:
  selecting the first conference participant in response to determining that the first viewport has largest area of overlap with the area of interest.

2. The method of claim 1, wherein identifying the trigger comprises:
  identifying speech in an audio stream received from the device of the first conference participant.

3. The method of claim 1, wherein identifying the trigger comprises:
  identifying that an edit to the whiteboard is received from the device of the first conference participant.

4. The method of claim 1, further comprising:
  receiving, from the device of the second conference participant, a second request identifying a third conference participant; and
  displaying, at the device of the second conference participant, a third viewport based on a fourth viewport into the whiteboard, wherein the fourth viewport is displayed at a device of the third conference participant, wherein the third viewport is displayed at the device of the second conference participant in addition to the second viewport.

5. The method of claim 1, further comprising:
  receiving, from the device of the second conference participant, a request to display a portion of the whiteboard; and
  displaying, at the device of the second conference participant, the portion of the whiteboard, wherein the portion of the whiteboard is displayed at the device of the second conference participant in addition to the second viewport.

6. The method of claim 1, further comprising:
  simultaneously displaying at the device of the second conference participant respective viewports of at least a subset of conference participants of the conference.

7. The method of claim 1, wherein the participant preference-selection rule is based one at least one of priorities associated with different follow-along participants and types of triggers.

8. The method of claim 1, wherein configuring the second viewport comprises:
  adjusting at least one of a resolution, an aspect ratio, or a zoom level of the second viewport to match a display configuration of the device of the second conference participant.

9. The method of claim 1, further comprising:
  presenting, to the second conference participant, a preview of the first viewport of the first conference participant.

10. A device, comprising:
  a memory; and
  a processor, the processor configured to perform instructions stored in the memory to:
    receive, from a device of a second conference participant, a first request designating a first conference participant of a conference as a follow-along participant for the second conference participant of the conference, wherein a whiteboard is enabled for the conference and two or more conference participants are potential follow-along participants available for designation by the second conference participant;
    identify a trigger associated with the first conference participant,
      wherein in response to identifying respective contemporaneous triggers associated with at least two conference participants, to identify the trigger comprises to:
      select the first conference participant based on a participant preference-selection rule that identifies which follow-along participant determines a viewport for setting a second viewport;
    configure, based on the trigger and for display at a device of the second conference participant, a second viewport based on a first viewport into the whiteboard, wherein the first viewport is displayed at a device of the first conference participant;
    in response to identifying a viewport change associated with another conference participant not designated as a follow-along participant for the second conference participant, omitting configuring the viewport for the second conference participant based on the viewport change; and
    receive, from the second conference participant, a selection of an area of interest within the whiteboard, wherein to select the first conference participant based on the participant preference-selection rule comprises to:
      select the first conference participant in response to determining that the first viewport has largest area of overlap with the area of interest.

11. The device of claim 10, wherein the instructions to identify the trigger comprises instructions to:
  identify speech in an audio stream received from the device of the first conference participant.

12. The device of claim 10, wherein the instructions to identify the trigger comprises instructions to:
  identify that an edit to the whiteboard is received from the device of the first conference participant.

13. The device of claim 10, wherein the processor is further configured to execute instructions stored in the memory to:
  receive, from the device of the second conference participant, a second request identifying a third conference participant; and
  display, at the device of the second conference participant, a third viewport based on a fourth viewport into the whiteboard, wherein the fourth viewport is displayed at a device of the third conference participant, and wherein the third viewport is displayed at the device of the second conference participant in addition to the second viewport.

14. The device of claim 10, wherein the processor is further configured to execute instructions stored in the memory to:
  receive, from the device of the second conference participant, a request to display a portion of the whiteboard; and display, at the device of the second conference participant, the portion of the whiteboard, wherein the portion of the whiteboard is displayed at the device of the second conference participant in addition to the second viewport.

15. The device of claim 10, wherein the processor is further configured to execute instructions stored in the memory to:
simultaneously display at the device of the second conference participant respective viewports of at least a subset of conference participants of the conference.

16. The device of claim 10, wherein the participant preference-selection rule is based one at least one of priorities associated with different follow-along participants and types of triggers.

17. A non-transitory computer readable medium storing instructions operable to cause one or more processors to perform operations comprising:
receiving, from a device of a second conference participant, a first request designating a first conference participant of a conference as a follow-along participant for the second conference participant of the conference, wherein a whiteboard is enabled for the conference and two or more conference participants are potential follow-along participants available for designation by the second conference participant;
identifying a trigger associated with the first conference participant,
wherein in response to identifying respective contemporaneous triggers associated with at least two conference participants, identifying the trigger comprises:
selecting the first conference participant based on a participant preference-selection rule that identifies which follow-along participant determines a viewport for setting a second viewport;
configuring, based on the trigger and for display at a device of the second conference participant, a second viewport based on a first viewport into the whiteboard, wherein the first viewport is displayed at a device of the first conference participant;
in response to identifying a viewport change associated with another conference participant not designated as a follow-along participant for the second conference participant, omitting configuring the viewport for the second conference participant based on the viewport change; and
receiving, from the second conference participant, a selection of an area of interest within the whiteboard, wherein selecting the first conference participant based on the participant preference-selection rule comprises:
selecting the first conference participant in response to determining that the first viewport has largest area of overlap with the area of interest.

18. The non-transitory computer readable medium of claim 17, wherein identifying the trigger comprises:
identifying speech in an audio stream received from the device of the first conference participant.

19. The non-transitory computer readable medium of claim 17, wherein identifying the trigger comprises:
identifying that an edit to the whiteboard is received from the device of the first conference participant.

20. The non-transitory computer readable medium of claim 17, wherein the operations further comprise:
receiving, from the device of the second conference participant, a second request identifying a third conference participant; and
displaying, at the device of the second conference participant, a third viewport based on a fourth viewport into the whiteboard, wherein the fourth viewport is displayed at a device of the third conference participant, wherein the third viewport is displayed at the device of the second conference participant in addition to the second viewport.

* * * * *